United States Patent [19]

Prior

[11] 4,292,803
[45] Oct. 6, 1981

[54] TURBO FAN ENGINE MIXER

[75] Inventor: Barry Prior, San Diego, Calif.

[73] Assignee: Rohr Industries, Inc., Chula Vista, Calif.

[21] Appl. No.: 4,674

[22] Filed: Jan. 19, 1979

[51] Int. Cl.³ ............................................. F02K 1/00
[52] U.S. Cl. ...................................... 60/230; 60/262; 239/265.37
[58] Field of Search ................. 60/262, 264, 319, 230; 239/265.37, 265.17, 265.29, 265.25; 181/219, 220, 222, 213; 417/179

[56] References Cited

U.S. PATENT DOCUMENTS

| | | | |
|---|---|---|---|
| 3,084,505 | 4/1963 | Cherchi | 181/220 |
| 3,113,428 | 12/1963 | Colley et al. | 60/262 |
| 3,587,777 | 6/1971 | Ellis | 181/220 |
| 3,625,008 | 12/1971 | Hewson et al. | 60/262 |
| 3,673,803 | 7/1972 | Macdonald | 60/264 |
| 4,117,671 | 10/1978 | Neal et al. | 239/265.17 |
| 4,135,363 | 1/1979 | Packman | 181/220 |
| 4,147,027 | 4/1979 | Greathouse | 239/265.37 |

Primary Examiner—Carlton R. Croyle
Assistant Examiner—Rae Cronmiller
Attorney, Agent, or Firm—Patrick J. Schlesinger; Frank D. Gilliam

[57] ABSTRACT

A turbo fan engine has a fan gas duct surrounding the exhaust or primary gas stream. The primary gas stream leaves the engine through a plurality of nozzles terminating within the fan gas stream. The nozzles are positioned so that mixing of the two gas streams is accomplished and, when utilized with a pair of clam shells for thrust reversing, cool air from the fan stream cools the inner surface of the clam shells and insulates the inner surface from the hot primary gas stream. The mixing of the streams is accomplished substantially within the fan gas duct.

3 Claims, 7 Drawing Figures

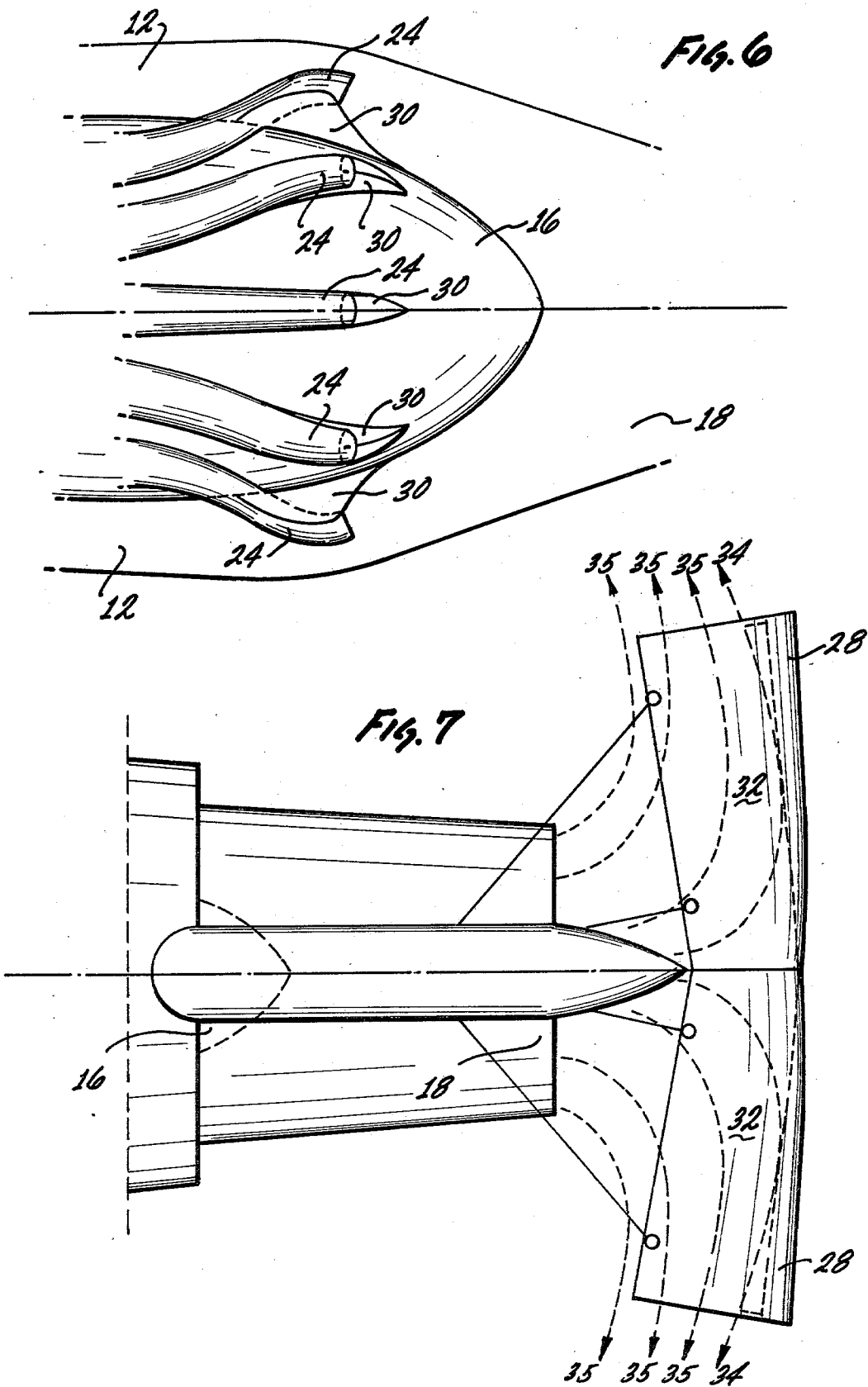

TURBO FAN ENGINE MIXER

BACKGROUND OF THE INVENTION

It is common knowledge within the aircraft industry that turbo fan engines are more efficient if the fan and primary gases are mixed within the confines of the engine and that a major portion of the noise from a jet aircraft engine is produced by the shearing encounter of the hot, high velocity primary gases with the ambient atmosphere. It is well known that any reduction in the temperature and/or velocity of the primary gases relative to the atmosphere at their shear zones reduces the noise generated in this zone. As a general rule, almost without exception, thrust reverser or blocker doors of the clam shell type are required to be constructed from materials that can withstand high temperatures, which often reach 1100° Fahrenheit. This inherently results in thrust reverser or blocker doors and their associated actuation devices that are quite heavy and, therefore, add considerable dead weight to the aircraft.

SUMMARY OF THE INVENTION

The primary object of this invention is to provide an exhaust structure for a turbo fan engine wherein the fan and primary gas streams are substantially mixed within a short physical space prior to leaving the confines of the engine to provide improved engine thrust and noise attenuation. Where aircraft thrust reversing is required, a portion of the fan gases are directed along the center or hub of the engine so that when the reversing doors are deployed for thrust reversing, the cool fan air insulates the inner surface of the door structure from the hot primary gases. This feature enables the utilization of lightweight reverser door structure and actuating devices to be utilized, thus increasing the payload capabilities of any given aircraft utilizing standard state of the art reverser doors and actuating mechanisms. These and other objects, features and advantages of the invention will become more readily apparent to those skilled in the art from the following detailed description of specific embodiments thereof, taken in connection with the accompanying drawings.

BRIEF DESCRIPTION OF THE DRAWINGS

FIG. 6 is a showing similar to FIG. 3, taken along line 6—6 of FIG. 5.

FIG. 7 is a diagrammatic showing of the fan and primary gas flow which encounters the thrust reversing clam shells of FIG. 4 when the clam shells are moved to the reverse thrust position.

DETAILED DESCRIPTION OF THE FIRST PREFERRED EMBODIMENT

The same referenced numerals are used throughout the specifications to depict the identical element or part.

Figure 1:
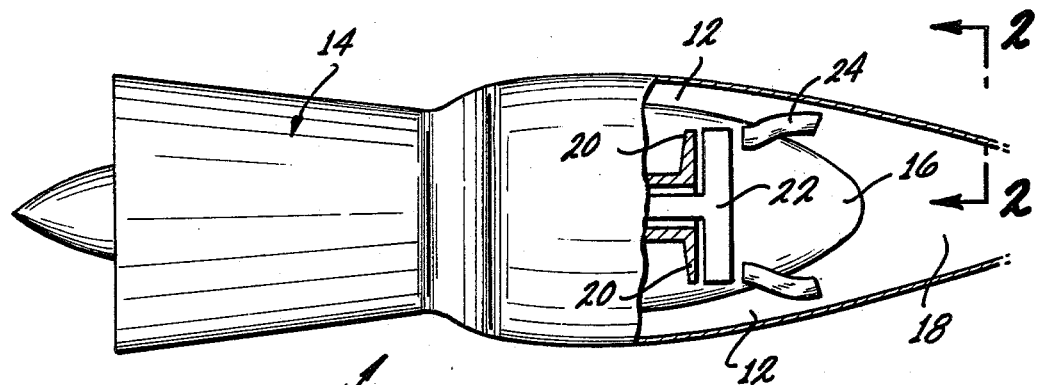
FIG. 1 is a side elevated diagrammatic partial cutaway showing of a turbo fan engine employing one embodiment of the invention.
Figure 3:
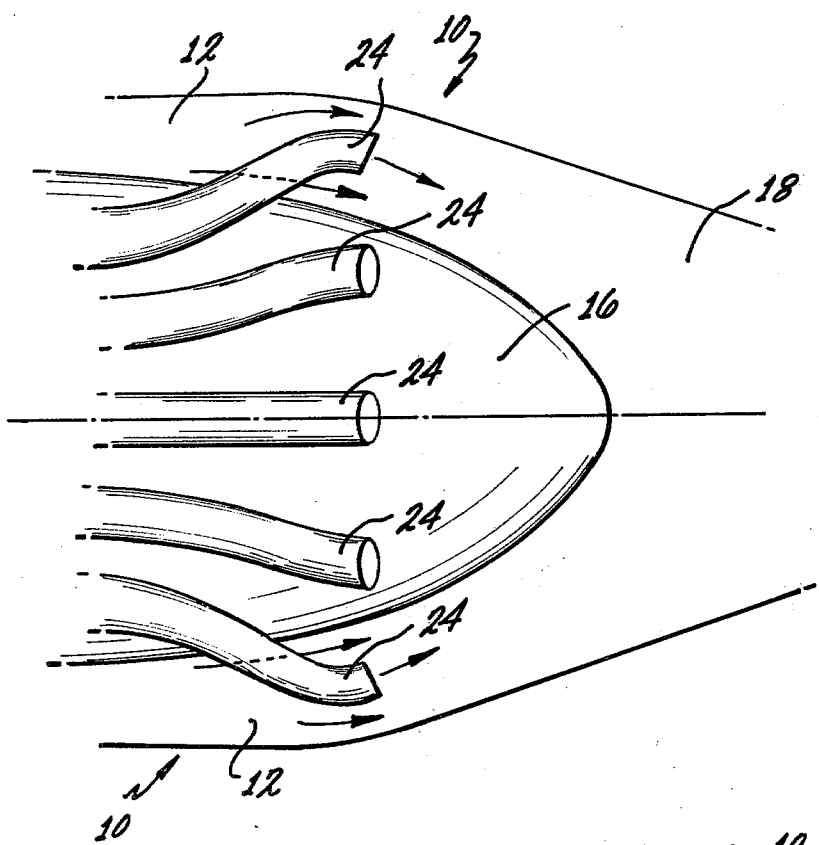
FIG. 3 is an enlarged showing of the rear section of FIG. 1.
Figure 2:
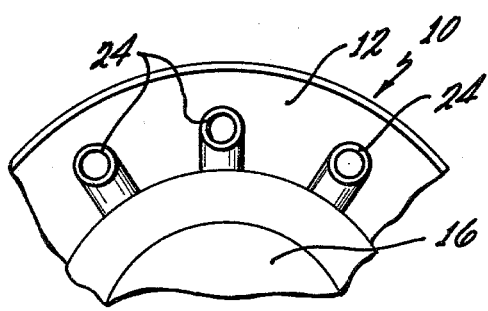
FIG. 2 is an enlarged partial end view of the turbo fan engine of FIG. 1 taken along line 2—2.
Figure 4:
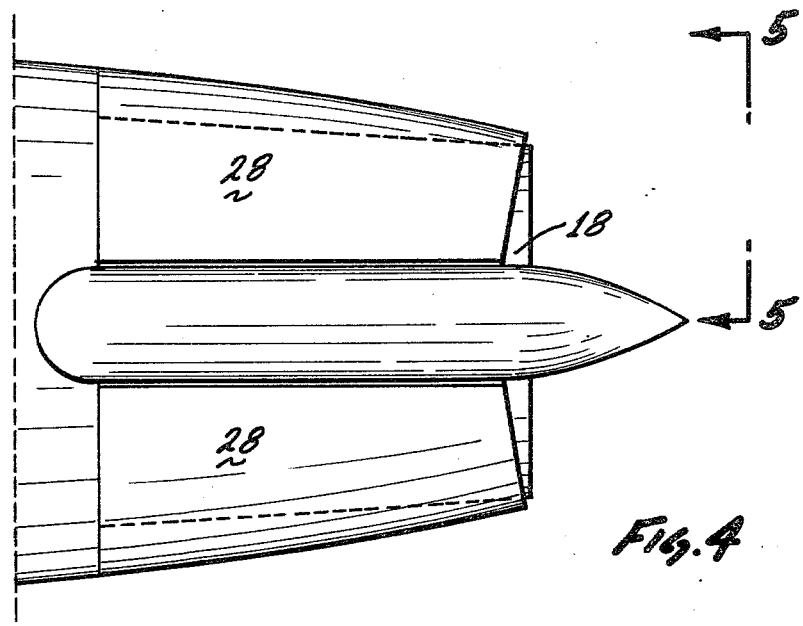
FIG. 4 is a side view showing of the aft end of the turbo fan engine of FIG. 1 equipped with thrust reversing clam shells shown in a stowed position.

Referring now to FIGS. 1–3, a typical turbo fan engine 10 is shown partially cutaway exposing a portion of the aft section thereof. The turbo fan engine 10 has a fan duct 12 which originates at the forward portion 14 of the engine 10 slightly aft of the fan (not shown) extending around the central core of the engine 16 and exiting the engine at the exhaust duct exit 18. At the rear of the engine is a high pressure turbine 20 driving a high pressure compressor (not shown) and a low pressure turbine 22 driving a low pressure compressor (not shown). Primary gases from the combustor (not shown) exit the engine through a plurality of primary gas tubes 24. These primary gas tubes 24 are positioned around the rear central core 16 of the engine 10 and extend from the low pressure turbine to a position intermediate the boundaries of the fan duct 12.

These primary gas tubes are positioned and configured so that a substantial mixing of the hot primary gases exiting the tubes 24 with the surrounding fan gases occurs prior to their combined exit through exhaust duct 18 into the atmosphere. It has been calculated that placement of the primary gas tubes 24 at approximately mid-radius of the fan duct is ideal. The mixing between the fan and exhaust gas streams is accelerated due to increased shear surface area between the streams. The placement of the primary gas ducts 24 in this manner reduces the length of the mixing duct and provides a more uniform temperature distribution at the nozzle exit 18.

DETAILED DESCRIPTION OF THE SECOND PREFERRED EMBODIMENT

Figure 5:
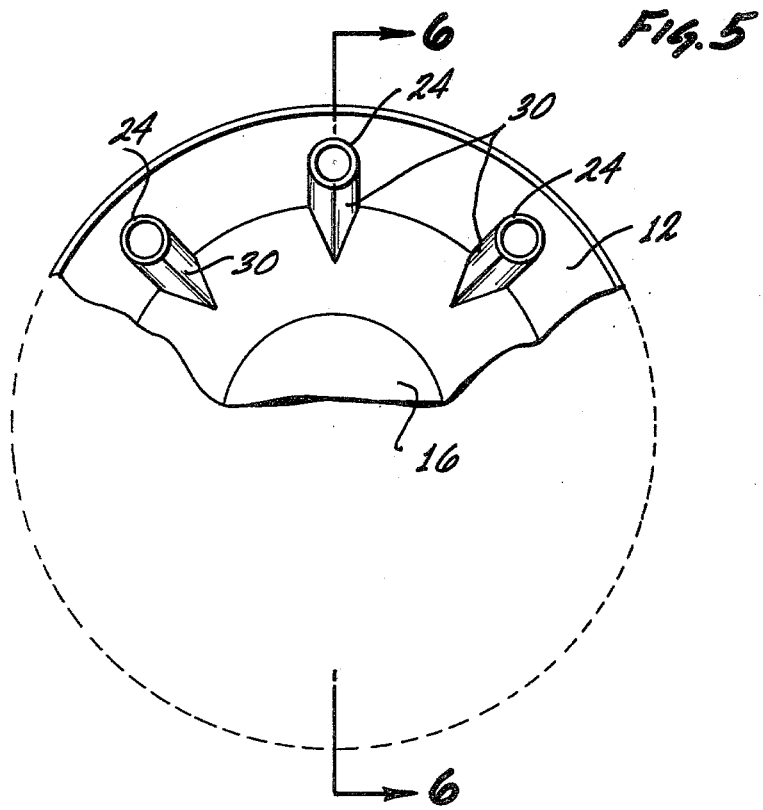
FIG. 5 is a showing similar to FIG. 2, taken along line 5—5 of FIG. 4, with fan gas directing fairings positioned between the primary nozzles and the central plug.

Referring now to FIGS. 4–7, FIG. 4 depicts the rear portion of turbo fan engine 10 equipped with blocker clam shells or doors 28 which are shown in their stowed position. The nozzle 18 is along the engine center line and extend further rearward than the blocker clam shells or doors 28. This type of thrust reverser device is shown and explained in detail in U.S. Pat. No. 3,013,386. It should, however, be understood that any thrust reversing device which translates rearward of the nozzle exit when deployed and redirects the gas streams in a forward direction may be utilized to successfully practice the invention. FIG. 5 shows a portion of the engine looking from the nozzle exit forward along line 5—5 of FIG. 4. The FIG. 5 showing is slightly modified from the FIG. 2 showing and includes aerodynamic fairings 30 formed between the primary tubes 24 and the central plug 16, which extend from a position at the primary tube outlets to a position along the central plug 16 so as to direct a portion of the cool fan gas substantially unmixed with primary gas along the surface of the central plug 16 toward the exhaust duct. The FIG. 6 showing is slightly modified from the FIG. 3 showing to include the aerodynamic fairings 30. The directing of the fan gases in this manner does not provide as complete a mixing of the two gas streams as does the first embodiment; however, the slight loss in engine efficiency accompanying the second embodiment as compared to the first provides an overall advantage when thrust reverses are employed. Due to the fact that the unmixed portion of fan stream, as shown in FIG. 7, impacts substantially the center or inner surface 32 of the clam shells or doors a protective layer of cool gas is provided adjacent the inner surface 32 of the clam shells or doors 28. This protective layer of cool gas, shown by direction arrows 34, insulates the reverser clam shells or doors from the hot gas mixture of the primary and fan gases, shown by the arrows 35. This unique feature allows for construction of the flaps or blocker doors from a lightweight material, such as, for example, aluminum. Due to the reduced temperature of the gas encountered by the clam shells or blocker doors, any lightweight material having the strength suitable for the purpose of reversing can be utilized.

It is to be understood that the invention is not limited to the specific embodiments herein illustrated and described, but may be used in other ways without departing from its spirit as defined by the following claims.

I claim:

1. Apparatus for a turbo-fan engine having a central core and an elongated cowl section spaced from said central core forming a fan duct therebetween, an engine plug attached to said central core and extending downstream thereof, the aft surface of said engine plug defining the aft boundry of said fan duct, said engine having primary and fan gas streams directing aft through said fan duct comprising:

nozzle means for introducing said primary gas stream into said fan duct, said nozzle means comprising a plurality of individual tubes attached around said central core by aerodynamic fairings whereby a substantial mixing of the gas streams is accomplished within said fan duct.

2. The apparatus as defined in claim 1, wherein said apparatus additionally includes blocker doors for reversing the direction of said gas streams, said nozzle means and said aerodynamic fairings being positioned so that when said blocker doors are displayed to their gas stream reversing position, a layer of fan gas impacts and insulates said blocker doors from the mixed gas streams.

3. The invention as defined in claim 1, wherein the individual tubes of said nozzle means are positioned substantially centered within said fan gas duct.

* * * * *